United States Patent
Shin et al.

(10) Patent No.: US 8,285,319 B2
(45) Date of Patent: Oct. 9, 2012

(54) COMBINED OPEN LOOP/CLOSED LOOP (CQI-BASED) UPLINK TRANSMIT POWER CONTROL WITH INTERFERENCE MITIGATION FOR E-UTRA

(75) Inventors: Sung-Hyuk Shin, Northvale, NJ (US); Donald M. Grieco, Manhasset, NY (US); Robert L. Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 743 days.

(21) Appl. No.: 11/862,459

(22) Filed: Sep. 27, 2007

(65) Prior Publication Data

US 2008/0081655 A1   Apr. 3, 2008

Related U.S. Application Data

(60) Provisional application No. 60/827,965, filed on Oct. 3, 2006, provisional application No. 60/863,188, filed on Oct. 27, 2006.

(51) Int. Cl.
*H04B 7/00* (2006.01)

(52) U.S. Cl. .............................. 455/522; 455/68; 455/69

(58) Field of Classification Search .................. 375/130, 375/295, 144; 455/522, 68, 69; 370/204, 370/208, 335, 412
See application file for complete search history.

(56) References Cited

U.S. PATENT DOCUMENTS

| | | | |
|---|---|---|---|
| 6,600,772 B1* | 7/2003 | Zeira et al. | 375/130 |
| 6,831,910 B1 | 12/2004 | Moon et al. | |
| 2002/0168994 A1* | 11/2002 | Terry et al. | 455/522 |
| 2004/0214593 A1* | 10/2004 | Shin et al. | 455/522 |
| 2005/0148368 A1* | 7/2005 | Scheinert et al. | 455/561 |
| 2005/0186981 A1* | 8/2005 | Nishio | 455/522 |
| 2005/0220176 A1* | 10/2005 | Zeira et al. | 375/144 |
| 2006/0040619 A1* | 2/2006 | Cho et al. | 455/69 |
| 2006/0046789 A1 | 3/2006 | Huh et al. | |
| 2006/0171349 A1* | 8/2006 | Holma et al. | 370/328 |

(Continued)

FOREIGN PATENT DOCUMENTS

WO   2006/099545   9/2006

(Continued)

OTHER PUBLICATIONS

Third Generation Partnership Project, "Technical Specification Group Radio Access Network; Physical Layer Aspects for Evolved Universal Terrestrial Radio Access (UTRAN) (Release 7)", 3GPP TR 25.814 V7.1.0 (Sep. 2006).

(Continued)

*Primary Examiner* — Lana N Le
*Assistant Examiner* — Golam Sorowar
(74) *Attorney, Agent, or Firm* — Volpe and Koenig, P.C.

(57) ABSTRACT

A combined open loop and closed loop (channel quality indicator (CQI)-based) transmit power control (TPC) scheme with interference mitigation for a long term evolution (LTE) wireless transmit/receive unit (WTRU) is disclosed. The transmit power of the WTRU is derived based on a target signal-to-interference noise ratio (SINR) and a pathloss value. The pathloss value pertains to the downlink signal from a serving evolved Node-B (eNodeB) and includes shadowing. An interference and noise value of the serving eNodeB is included in the transmit power derivation, along with an offset constant value to adjust for downlink (DL) reference signal power and actual transmit power. A weighting factor is also used based on the availability of CQI feedback.

13 Claims, 2 Drawing Sheets

U.S. PATENT DOCUMENTS

| | | | | |
|---|---|---|---|---|
| 2006/0210001 | A1* | 9/2006 | Li et al. | 375/346 |
| 2006/0256756 | A1* | 11/2006 | Wakabayashi | 370/335 |
| 2006/0262840 | A1* | 11/2006 | Wang et al. | 375/221 |
| 2006/0276191 | A1* | 12/2006 | Hwang et al. | 455/436 |
| 2007/0230324 | A1* | 10/2007 | Li et al. | 370/204 |
| 2009/0010211 | A1 | 1/2009 | Sumasu et al. | |

FOREIGN PATENT DOCUMENTS

| | | |
|---|---|---|
| WO | 2006/099547 | 9/2006 |

OTHER PUBLICATIONS

Third Generation Partnership Project, "Technical Specification Group Radio Access Network; Physical Layer Procedures (FDD), (Release 6)", 3GPP TS 25.214 V6.9.0 (Jun. 2006).

Interdigital Communications Corporation, "Text Proposal for 25.224," TSG-RAN Working Group 1 Meeting #6, TSGR1#6(99)1008 (Jul. 13-16, 1999).

IPwireless, "ED-TDD: Power Control of E-DCH Physical Channels," 3GPP TSG RAN WG1 #42bis, R1-051232 (Oct. 10-14, 2005).

Third-Generation Partnership Project, "Technical Specification Group-Radio Access-Network; Physical Layer Procedures (FDD) (Release 7)", 3GPP TS 25.214 V7.5.0 (May 2007).

Third Generation Partnership Project, "Technical Specification Group Radio Access Network; Physical Layer Procedures (FDD) (Release 6)", 3GPP TS 25.214 V6.9.0 (Jun. 2006).

Third Generation Partnership Project, "Technical Specification Group Radio Access Network; Physical Layer Procedure (FDD) (Release 7)", 3GPP TS 25.214 V7.5.0 (May 2007).

Interdigital Communications Corporation, "Combined Open Loop/ CQI Based Uplink Power Control for E-UTRA," 3GPP TSG RAN WG1 #46, R1-062496 (Oct. 9-13, 2006).

Interdigital Communications Corporation, "Issues Regarding Open Loop Schemes for Uplink Power Control in TDD," TSG-RAN Working Group1 Meeting #5, TSGR1#5(99)576 (May 31, 1999).

Interdigital Communications Corporation, "Text Proposal for 25.224," TSG-RAN Working Group1 Meeting #6, TSGR1#6(99)1008 (Jul. 13-16, 1999).

IPwireless, "EU-TDD: Power Control of E-DCH Physical Channels," 3GPP TSG RAN WG1 #42bis, R1-051232 (Oct. 10-14, 2005).

MCC Support, "Draft Report of 3GPP TSG RAN WG1 #48b v0.3.0 (St. Julian, Malta, Mar. 26-30, 2007)," 3GPP TSG RAN WG1 Meeting #49, R1-072001 (May 7-11, 2007).

Motorola, "Interference Mitigation Via Power Control and FDM Resource Allocation and UE Alignment for E-UTRA and TP", 3GPP TSG RAN1#44, R1-060401, (Denver, Feb. 13-17, 2006).

Nokia, "Uplink Power Control", 3GPP TSG RAN WG1 #44 Meeting, R1-060297, (Denver, Feb. 13-17, 2006).

Nokia, "Power control email discussion summary," 3GPP TSG RAN WG1 #47bis, R1-070402 (Jan. 15-19, 2007).

Nokia, "Summary of UL Power Control Email Discussion," 3GPP TSG RAN WG1 #48bis, R1-071665 (Mar. 26-30, 2007).

NTT DOCOMO et al., "Transmission Power Control in E-UTRA Uplink," 3GPP TSG RAN WG1 Meeting #47bis, R1-070108 (Jan. 15-19, 2007).

NTT DOCOMO, "Fast Transmission Power Control in E-UTRA", 3GPP TSG RAN WG1 LTE Ad Hoc, R1-061668, (Cannes, France, Jun. 27-30, 2006).

QUALCOMM Europe, "Analysis of Inter-Cell Power Control for Interference Management in E-UTRA UL", 3GPP TSG-RAN WG1 #46bis, R1-062705, (Seoul, Korea, Oct. 9-13, 2006).

QUALCOMM Europe, "Considerations on Power Control for Ofdma Based E-UTRA Uplink Evaluation", 3GPP TSG-RAN WG1 #42, R1-050898, (London, United Kingdom, Aug. 29-Sep. 2, 2005).

Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912 V7.2.0 (Jun. 2007).

Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912 V7.0.0 (Jun. 2006).

Third Generation Partnership Project, "Technical Specification Group Radio Access Network; Physical Layer Aspects for Evolved Universal Terrestrial Radio Access (UTRA) (Release 7)", 3GPP TR 25.814 V7.1.0 (Sep. 2006).

Third Generation Partnership Project, "Technical Specification Group Radio Access Network; Physical Layer Aspects for Evolved Universal Terrestrial Radio Access (UTRA) (Release 7)", 3GPP TR 25.814 V7.0.0 (Jun. 2006).

Third Generation Partnership Project, "Technical Specification Group Radio Access Network; Physical Layer Procedures (FDD) (Release 7)", 3GPP TS 25.214 V7.5.0 (May 2007).

Third Generation Partnership Project, "Technical Specification Group Radio Access Network; Physical Layer Procedures (FDD) (Release 7)", 3GPP TS 25.214 V7.1.0 (Jun. 2006).

Third Generation Partnership Project, "Technical Specification Group Radio Access Network; Physical Layer Procedures (FDD) (Release 7)", 3GPP TS 25.214 V6.9.0 (Jun. 2006).

Third Generation Partnership Project, "Technical Specification Group Radio Access Network; Evolved Universal Terrestrial Radio Access (E-UTRA); Multiplexing and channel coding (Release 8)," 3GPP TS 36.212 V2.0.0 (Sep. 2007).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.0.0 (Sep. 2007).

Third Generation Partnership Project, "Technical Specification Group Radio Access Network; Evolved Universal Terrestrial Radio Access (E-UTRA); Physical Layer procedures (Release 8)," 3GPP TS 36.213 V8.0.0 (Sep. 2007).

Third Generation Partnership Project, "Technical Specification Group Radio Access Network; Evolved Universal Terrestrial Radio Access (E-UTRA); Physical Layer procedures (Release 8)," 3GPP TS 36.213 V2.1.0 (Sep. 2007).

Third Generation Partnership Project, "Technical Specification Group Radio Access Network; Physical layer procedures (FDD) (Release 6)," 3GPP TS 25.214 V6.11.0 (Dec. 2006).

Viorel et al., "Optional Open Loop Power Control for OFDM," IEEE 802.16 Broadband Wireless Access Working Group, IEEE C802.16e05_312 (Jul. 11, 2005).

* cited by examiner

COMBINED OPEN LOOP/CLOSED LOOP (CQI-BASED) UPLINK TRANSMIT POWER CONTROL WITH INTERFERENCE MITIGATION FOR E-UTRA

CROSS REFERENCE TO RELATED APPLICATIONS

This application claims the benefit of U.S. Provisional Application No. 60/827,965 filed Oct. 3, 2006 and U.S. Provisional Application No. 60/863,188 filed Oct. 27, 2006, which are incorporated by reference as if fully set forth.

FIELD OF INVENTION

The present invention is related to wireless communication systems.

BACKGROUND

For the evolved universal terrestrial radio access (E-UTRA) uplink (UL), there are several transmit power control (TPC) proposals that were submitted to third generation partnership project (3GPP) long term evolution (LTE) Work Group 1 (WG1). These proposals can be generally divided into (slow) open loop TPC and slow closed loop or channel quality information (CQI)-based TPC.

Open loop TPC is based on pathloss measurement and system parameters where the pathloss measurement is performed at a wireless transmit/receive unit (WTRU) and the system parameters are provided by an evolved Node-B (eNodeB).

Closed loop TPC is typically based on TPC feedback information, (such as a TPC command), that is periodically sent from the eNodeB where the feedback information is generally derived using signal-to-interference noise ratio (SINR) measured at the eNodeB.

Open loop TPC can compensate for long-term channel variations, (e.g. pathloss and shadowing), in an effective way, for instance, without the history of the transmit power. However, open loop TPC typically results in pathloss measurement errors and transmit power setting errors. On the other hand, slow closed loop or CQI-based TPC is less sensitive to errors in measurement and transmit power setting, because it is based on feedback signaled from the eNodeB. However, slow closed loop or CQI-based TPC degrades performance when there is no available feedback due to UL transmission pause, or pauses in the feedback transmission or channel variations are severely dynamic.

SUMMARY

For the E-UTRA UL, TPC is considered to compensate for at least path loss and shadowing and/or to mitigate interference. An enhanced UL TPC scheme that combines an open loop TPC scheme and a closed loop TPC with interference mitigation is disclosed. The closed loop TCP is based on CQI, (e.g., UL grant information or modulation and coding set (MCS) information). This enhanced UL TPC scheme can be used for both the UL data and control channels. Also, this proposed enhanced UL TPC scheme is flexible and adaptive to dynamic system/link parameters and channel conditions, in order to achieve the E-UTRA UL requirements.

Additionally, in order to avoid poor UL channel and CQI estimation where the channel and CQI estimation is based on the UL reference signal, it is proposed that the UL TPC for a data channel is performed at a slow rate such as 100 Hz, (i.e., one TPC update per one or two hybrid automatic repeat request (HARQ) cycle period(s)). For data-associated control signaling, the TPC update rate may be increased to 1000 Hz, assuming a maximum CQI reporting rate of once per 1 msec transmission timing interval (TTI).

BRIEF DESCRIPTION OF THE DRAWINGS

The foregoing summary, as well as the following detailed description, will be better understood when read with reference to the appended drawings, wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "evolved Node-B (eNodeB)" includes but is not limited to a base station, a Node-B, a cell, a site controller, an access point (AP), or any other type of interfacing device capable of operating in a wireless environment.

Figure 1:
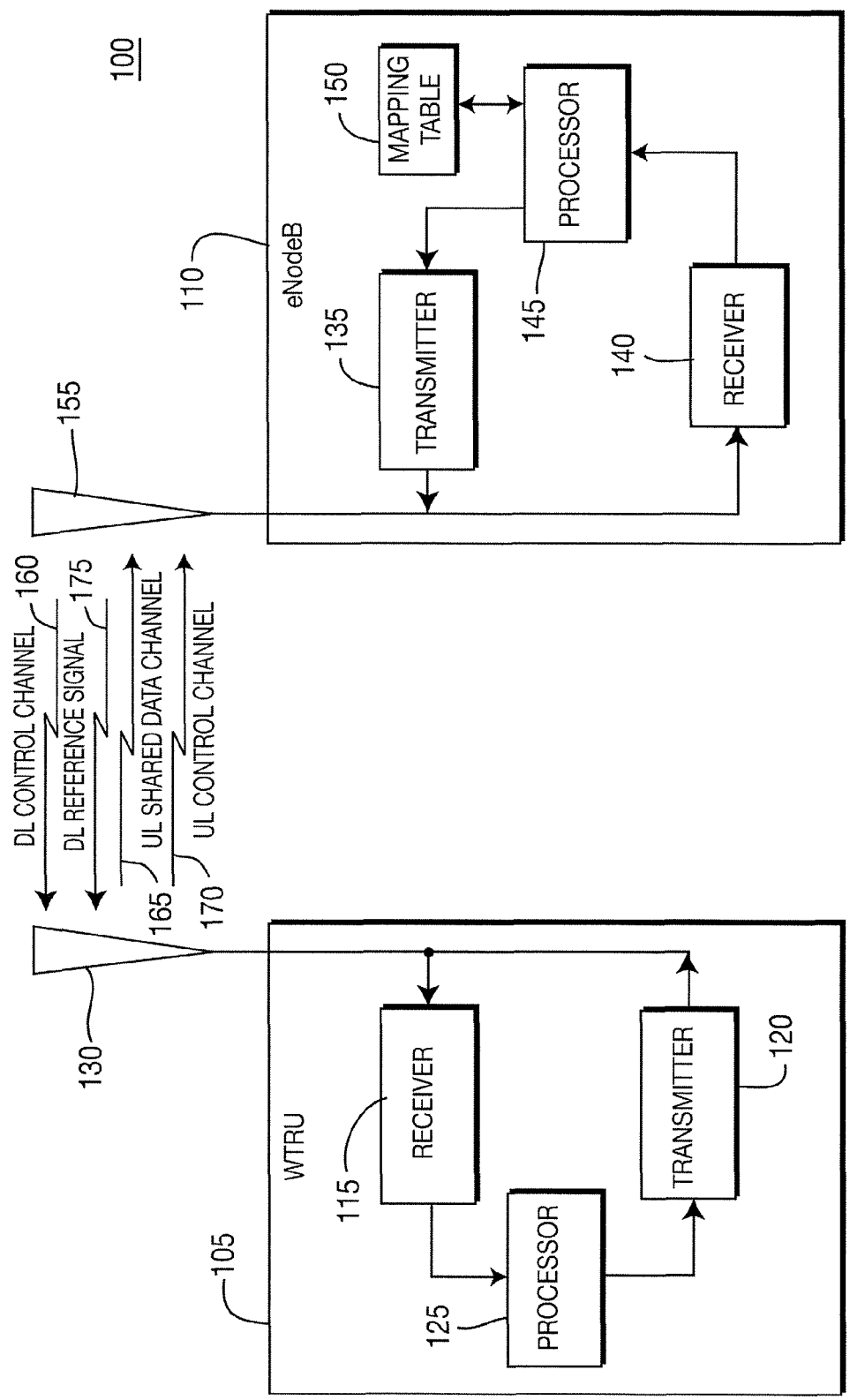
FIG. 1 shows a wireless communication system including a WTRU and an eNodeB.

FIG. 1 shows a wireless communication system 100 including at least one WTRU 105 and at least one serving eNodeB 110. The WTRU 105 includes a receiver 115, a transmitter 120, a processor 125 and at least one antenna 130. The serving eNode-B 110 includes a transmitter 135, a receiver 140, a processor 145, a mapping table 150 and at least one antenna 155. The WTRU 105 and the eNodeB 110 communicate via a downlink (DL) control channel 160, a UL shared data channel 165 and a UL control channel 170.

The processor 145 in the eNodeB 110 performs UL interference over thermal noise (IoT) measurements, based on signals received by the receiver 140, and compares the measured IoT measurements to a predefined threshold. The processor 145 also generates an interference load indicator that is broadcast by the transmitter 135 of the eNodeB 110 on either a regular basis or a trigger basis. The interference load indicator indicates whether or not the IoT measurements performed at the eNodeB 110 exceed the predefined threshold. When the receiver 115 in the WTRU 105 receives and decodes the interference load indicator, the processor 125 in the WTRU 105 is able to determine the status of the IoT at the eNodeB 110, which can be used to mitigate inter-cell interference in the eNodeB 110.

The WTRU 105 performs open loop TPC based on system parameters and pathloss measurements while it is located in a particular cell. The WTRU 105 relies on the interference load indicator to mitigate inter-cell interference in the eNodeB 110, which is located in the strongest cell neighboring the particular cell as compared to other neighboring cells. The strongest cell refers to a cell to which the WTRU 105 has the highest path gain, (i.e., least path loss). The WTRU 105 then corrects its open loop based calculated transmit power, which may be biased due to open loop errors, according to CQI received via the DL control channel 160 and target SINR, in order to compensate for the open loop errors.

It should be noted that the CQI refers to the UL grant information (or MCS) that the eNodeB 110 signals to the WTRU 105 via the DL control channel 160 for UL link adaptation. The CQI represents the WTRU specific UL channel quality which the serving eNodeB 110 feeds back to the WTRU 105 in the DL control channel 160. In E-UTRA, the CQI is provided in the form of UL grant information. The target SINR is a WTRU-specific parameter determined by the eNodeB 110 and signaled to the WTRU 105 via higher layer signaling.

The WTRU 105 transmit power, $P_{Tx}$, for the UL shared data channel 165 is determined in an initial transmission phase based on a DL reference signal 175 transmitted by the transmitter 135 of the eNodeB 110. The DL reference signal 175 has a known transmit power that the WTRU 105 uses for pathloss measurement. For intra-cell TPC, the WTRU 105 initial transmit power, $P_{Tx}$, is defined based on open loop TPC as follows:

$$P_{Tx} = \max(\min(SINR_T + PL + IN_0 + K, P_{max}), P_{min}). \quad \text{Equation (1A)}$$

where $SINR_T$ is the target signal-to-interference noise ratio (SINR) in dB at the serving eNodeB 110, and PL is the pathloss, (i.e., a set point parameter), in dB, including shadowing, from the serving eNodeB 110 to the WTRU 105. The WTRU 105 measures the pathloss based on the DL reference signal 175, whose transmit power is known at the WTRU 105 via DL signaling. The value $IN_0$ is the UL interference and noise power in dBm at the serving eNodeB 110. K is a power control margin used for the serving eNodeB 110, taking into account the fact that, in practice, the power of the DL reference signal 175 may be offset from the actual transmit power. $P_{max}$ and $P_{min}$ are the maximum and minimum transmit power levels in dBm, respectively, for transmissions made by the WTRU 105 over the UL shared data channel 165.

The target SINR for a WTRU 105, (or a sub-group of WTRUs), is assumed to be adjustable according to a certain metric at the serving eNodeB 110. An outer loop TPC scheme may be used for the target SINR adjustment. In general, the target SINR is determined based on the target link quality, (e.g., block error rate (BLER)), of the UL shared data channel 165. In addition, different multipath fading channel conditions typically require a different target SINR for a given target link quality, (e.g., BLER). Accordingly, the metric includes the target link quality (and possibly fading channel condition) to the WTRU 105.

In the case of UL multiple-input multiple output (MIMO), the target SINR also depends on a selected MIMO mode, taking into account the fact that different MIMO modes require different power or SINRs for a given link quality (e.g., BLER). In this case, the WTRU 105 may comprise a plurality of antennas 130.

Alternatively, the WTRU 105 transmit power, $P_{Tx}$, may be defined including inter-cell TPC as follows:

$$P_{Tx} = \max(\min(SINR_T + PL + IN_0 + K + \Delta(IoT_S), P_{max}), P_{min}); \quad \text{Equation (1B)}$$

where the value $\Delta(IoT_S)$ represents the UL load control step size, which is a function of the UL interference load indicator ($IoT_S$) of the strongest (S) neighboring cell, $IoT_S$.

$\Delta(IoT_S)$ takes an integer value as follows:

$$\Delta(IoT_S) = \begin{cases} \delta < 0, & \text{when } IoT_S = 1 \text{ (e.g., down command)} \\ 0, & \text{when } IoT_S = 0 \text{ (e.g., no change)}; \end{cases} \quad \text{Equation (2)}$$

where $\delta$ is a predefined system parameter, e.g., $\delta = -1$ or $-2$ dB. With the use of $\Delta(IoT_S)$, inter-cell interference in neighboring cells can be mitigated. Since WTRUs at cell center inject less interference into other cells than those at cell edge, a fraction of the load control step size is considered as follows:

$$\delta = \begin{cases} \delta, & \text{for } \textit{WTRUs} \text{ at cell edge} \\ \dfrac{\delta}{x}, & \text{for cell interior } \textit{WTRUs} \text{ where } x > 1; \end{cases} \quad \text{Equation (3)}$$

where x is the fractional inter-cell load control factor.

The strongest neighboring cell is determined at the WTRU 105, based on pathloss measurements from the individual neighboring cell to the WTRU 105, where the strongest neighboring cell is the neighboring cell to which the WTRU 105 has the least pathloss among the cells neighboring the cell that the WTRU 105 is currently served by.

$\Delta(IoT_S)$ is introduced to mitigate inter-cell interference, (e.g., inter-cell TPC), especially to the strongest neighboring cell. For inter-cell TPC, eNodeB measures UL interference (on a regular basis or periodically) and then determines whether or not the measured interference level exceeds a predefined threshold. The resulting status on the UL interference is broadcast using $IoT_S$ (i.e., the load indicator) from the eNodeB 110 (on a regular basis or a trigger basis). For example, if the interference exceeds the threshold, then $IoT_S$ is set to 1, whereby the eNodeB 110 commands WTRUs in neighboring cells to reduce their transmit power by a certain amount, since the eNodeB 110 experiences excessive inter-cell interference in the UL. Otherwise, $IoT_S$ is set to 0, whereby the eNodeB 110 accepts the current UL interference level, so that WTRUs in neighboring cells do not require their transmit power to be reduced. The WTRU 105 decodes the load indicator received from the strongest neighboring cell and then follows the command ($IoT_S$). If $IoT_S$ is decoded as 1, then the transmit power of the WTRU 105 is reduced by $\Delta(IoT_S)$, that is, $\Delta(IoT_S) < 0$ dB. If $IoT_S$ is decoded as 0, then $\Delta(IoT_S) = 0$ dB.

It is assumed that each cell broadcasts a UL interference load bit periodically, (similar to the relative grant in high speed uplink packet access (HSUPA)), so that the WTRU 105 can decode the indicator bit from the selected strongest neighboring cell. The WTRU 105 may make a decision on whether the WTRU 105 is at cell edge or at cell interior, based on a pathloss ratio between its serving cell and the strongest neighboring cell. Alternatively, the fractional inter-cell load control factor x may be defined as follows:

$$x = \frac{\text{pathloss from the strongest neighboring cell}}{\text{pathloss from the serving cell}} > 1. \quad \text{Equation (4)}$$

After an initial transmission phase during which the WTRU 105 starts implementing its TPC immediately after power up (similar to random access channel (RACH) processing) or after a session connection is established, the WTRU transmit power is calculated as follows:

$$P_{tx} = \max(\min(SINR_T + PL + IN_0 + K + \alpha \cdot f(CQI, SINR_T), P_{max}), P_{min}); \quad \text{Equation (5)}$$

where $f(CQI, SINR_T)$ is a closed loop correction factor based on the UL CQI, (e.g., UL grant information or MCS information), and the corresponding target SINR. A weighting factor $\alpha$ may be determined, where $0 \leq \alpha \leq 1$, according to channel conditions and CQI availability (or UL transmission pause). For example, in the case that there is no UL CQI (UL grant or MCS information) available from the eNodeB 110 due to a lack of a scheduled UL data transmission, the weighting factor $\alpha$ is set to zero. Otherwise, the weighting factor $\alpha$ is set to one. Although for simplicity, the weighting factor $\alpha$ is set to 0 or 1 here, an alternative embodiment includes an adaptive α value adapted to channel conditions and UL/DL channel configuration.

The correction factor, f(CQI, SINR$_T$), is used to compensate for open loop TPC related errors, including the pathloss measurement error mainly due to non-perfect reciprocity in UL and DL in frequency division duplex (FDD), and the impairment of the transmitter 120 of the WTRU 105 due to non-linear power amplification. In addition to the pathloss, which is a set point parameter, the eNodeB 110 may facilitate the correction factor to adjust the TPC relevant system parameters such as SINR, IN$_0$ and K, which are also set point parameters. For example, when it is necessary for the eNodeB 110 to adjust the target SINR for a given WTRU 105 and then let the WTRU 105 know about the adjustment, the eNodeB 110 may adjust CQI (UL grant) for the WTRU 105 accordingly, rather than directly signaling the target SINR to the WTRU 105. The correction factor is calculated by the WTRU 105 according to the UL CQI (UL grant or MCS information) feedback from the serving eNodeB 110, taking into account the fact that the UL CQI represents the SINR received at the eNodeB 110. For example, $$f(CQI, SINT_T) = SINR_T - E\{SINR_{est}(CQI)\}(dB); \quad \text{Equation (6)}$$

where SINR$_{est}$ (CQI) represents the eNodeB received SINR estimate which the WTRU 105 derives from the UL CQI feedback based on a SINR-to-CQI mapping table that is signaled via a higher layer from the serving eNodeB 110. E{SINR$_{est}$(CQI)} denotes the estimated SINR average over time such that:

$$E\{SINR_{est}(CQI^k)\} = \rho \cdot E\{SINR_{est}(CQI^{k-1})\} + (1-\rho) \cdot E\{SINR_{est}(CQI^k)\}; \quad \text{Equation (7)}$$

where CQI$^k$ represents the k-th received CQI and ρ is the averaging filter coefficient, $0 \leq \rho \leq 1$.

The correction factor, given above by the difference between the target SINR and the estimated SINR (derived from the reported CQIs), typically represents the open loop TPC related errors which need to be compensated.

eNodeB Signaling for the Proposed TPC Scheme

A target SINR level, SINR$_T$, which is a WTRU (or a subgroup of WTRUs)-specific parameter, may be signaled by the eNodeB 110 to the WTRU 105 as a function of the distance (e.g., pathloss) from the eNodeB 110 to the WTRU 105 and/or the given quality requirement(s), such as BLER. Typically, the eNodeB 110 uses the mapping table 150 to map a target quality (e.g., BLER) to a target SINR value. How such a mapping table is generated is the eNodeB's (or carrier operator's) proprietary scheme. The target SINR may be adjusted through an outer loop mechanism. The signaling of the target SINR is done via in band L1/2 control signaling upon its adjustment.

A power control margin, K, which is an eNodeB-specific parameter used primarily for the DL reference signal, may be signaled by the eNodeB 110 to the WTRU 105. For instance, the DL reference signal 175 is used for the pathloss measurement of the WTRU 105, since the DL reference signal 175 is transmitted with a constant transmit power level which is known at the WTRU via higher layer signaling. However, the actual transmit power of the DL reference signal 175 may be different than the signaled power value due to an eNodeB's proprietary scheme. In this case, the power offset is between the actually used transmit power and the transmit power signaled via a broadcast channel (BCH) on a semi-static basis. K is likely to be semi-static and signaled via a broadcast channel (BCH). The WTRU 105 uses this information for its UL/DL pathloss calculation. It should be noted that even though the power control margin, K, is assumed to be separately signaled along with the other parameters, it may be embedded in the target SINR, SINR$_T$, such that:

$$SINR_T(\text{after embedding}) = SINR_T + K(dB). \quad \text{Equation (8)}$$

In this case, explicit signaling of K to the WTRU 105 is not required.

A total UL interference and noise level, IN$_0$, which is averaged across all of the sub-carriers (or radio bearers (RBs)) in use, or a subset of the sub-carriers, may be signaled by the eNodeB 110 to the WTRU 105. This is measured/derived by the eNodeB 110 (and possibly signaled via the BCH). The update rate for this signaling is generally relatively slow. The eNodeB 110 measures/estimates IN$_0$ on a regular basis using an eNodeB proprietary scheme, such as a noise estimation technique.

The maximum and minimum UL transmit power level, P$_{max}$ and P$_{min}$, may be signaled by the eNodeB 110 to the WTRU 105. These may be WTRU capability dependent parameters or may be expressly signaled by the eNodeB 110.

A UL CQI, (e.g., UL grant information or MCS information), which is signaled originally for the purpose of UL link adaptation, (e.g., adaptive modulation and coding (AMC)), (with a maximum signaling rate of once per TTI, e.g. 1000 Hz), may be signaled by the eNodeB 110 to the WTRU 105.

The UL CQI, (e.g., UL grant information), is WTRU-specific feedback information that the eNodeB 110 signals to the WTRU 105. Although UL CQI was originally used for the purpose of UL link adaptation, it is also used for the closed loop component of the proposed combined open loop and closed loop TPC. Generally, the CQI (UL grant) is derived based on the UL channel condition, (e.g., SINR measurement at the eNodeB 110) and a SINR-to-CQI mapping rule, meaning the UL CQI represents the SINR measured at the eNodeB 110. Accordingly, once the WTRU 105 receives a CQI and is given the mapping rule which is used for the SINR-to-CQI mapping at the eNodeB 110, then the WTRU 105 can interpret the received CQI to a SINR estimate. The estimated SINR is used for calculating the correction term in accordance with Equation (6).

A CQI mapping rule, (or bias between CQI and measured SINR), which the eNodeB 110 uses for CQI feedback generation, may be signaled by the eNodeB 110 to the WTRU 105. This rule or parameter may be combined into the target SINR. In this case, explicit signaling of the rule (or parameter) is not required.

The above TPC scheme is advantageous because it does not require additional feedback TPC commands other than the above listed system parameters, including the target SINR, cell interference/noise level, reference signal transmit power, and constant value, which can be broadcast (or directly signaled) to WTRUs on a slow rate basis. Furthermore, the above TPC scheme is designed to be flexible and adaptive to dynamic system/link parameters, (target SINR and inter-cell interference loading condition), and channel conditions, (path loss and shadowing), in order to achieve the E-UTRA requirements. Additionally, the above TPC scheme is compatible with other link adaptation schemes such as AMC, HARQ, and adaptive MIMO.

Even though the scheme proposed herein uses UL CQI, (e.g., UL grant information), for the closed loop component, (e.g., the correction factor), of the proposed combined open loop and closed loop TPC for E-UTRA UL; alternatively, the eNodeB 110 may explicitly signal to the WTRU 105 a correction command embedded in UL grant information. In this case, the WTRU 105 may use the explicitly signaled correction command for the closed loop correction factor (possibly combined with UL CQI). In addition, the proposed TPC may be used for inter-cell interference mitigation, if the serving eNodeB 110 coordinates inter-cell interference levels with other cells and incorporates them through adjusting the target SIR or possibly $P_{max}$ accordingly.

For accurate UL channel estimation (for UL data/control signaling demodulation) and CQI estimation (for UL scheduling and link adaptation), it is desirable to adjust the UL reference signal transmit power at a relatively fast rate to cope with poor channel and/or system conditions as quickly as possible. Even though the above proposed UL TPC for data channels updates the WTRU transmit power at a slow rate, (taking into account UL AMC per 1 msec-TTI), an update rate of as fast as 100 Hz may be implemented, (e.g., one update per one or two HARQ cycle period(s)), in order to avoid poor UL channel and CQI estimation. The update rate is controlled by the WTRU 105, preferably such that the WTRU 105 can update every time a CQI is received.

For the UL control signaling, the WTRU 105 uses the above combined TPC scheme with the following deviations. When UL CQI is available with a maximum CQI reporting rate of once per 1 msec TTI, a fast TPC update rate is used (e.g., 1000 Hz). In this case, the correction factor, f(CQI, $SINR_T$), in Equation (5) can be expressed as follows:

$$f(CQI, SINR_T) = SINR_T - SINR_{est}(CQI)(dB); \quad \text{Equation (9)}$$

where CQI is the most recent UL CQI. In addition, the weighting factor is set equal to one ($\alpha=1$). This results in a combined open loop and fast CQI-based TPC. When no UL CQI is available, the CQI-based TPC component is disabled, (i.e., $\alpha=0$). This results in open loop TPC only.

For the UL shared data channel 165, the WTRU 105 determines its transmit power based on a combined open loop and CQI based TPC at a slow update rate, such as 100 Hz. In the initial transmission, and/or when there is no UL CQI available from the eNodeB 110, such as during a transmission pause, the CQI-based transmit power control component is disabled, and only open loop TPC is used.

For the UL shared data channel 165, the WTRU 105 determines its transmit power based on a combined open loop and CQI-based TPC at a fast update rate, such as up to 1000 Hz. When there is no UL CQI available from the eNodeB 110, such as during a transmission pause, the CQI-based transmit power control component is disabled and only open loop TPC is used.

The eNodeB 110 broadcasts the TPC associated system parameters including its reference signal transmit power level, interference level, and power margin. In addition, the eNodeB 110 signals to the WTRU 105 the TPC associated WTRU-specific parameters, including target SINR, the WTRU maximum power level, and the minimum power level, where the signaling is done via in-band layer 1/2 control signaling. An outer loop may be used to adjust the target SINR.

Figure 2:
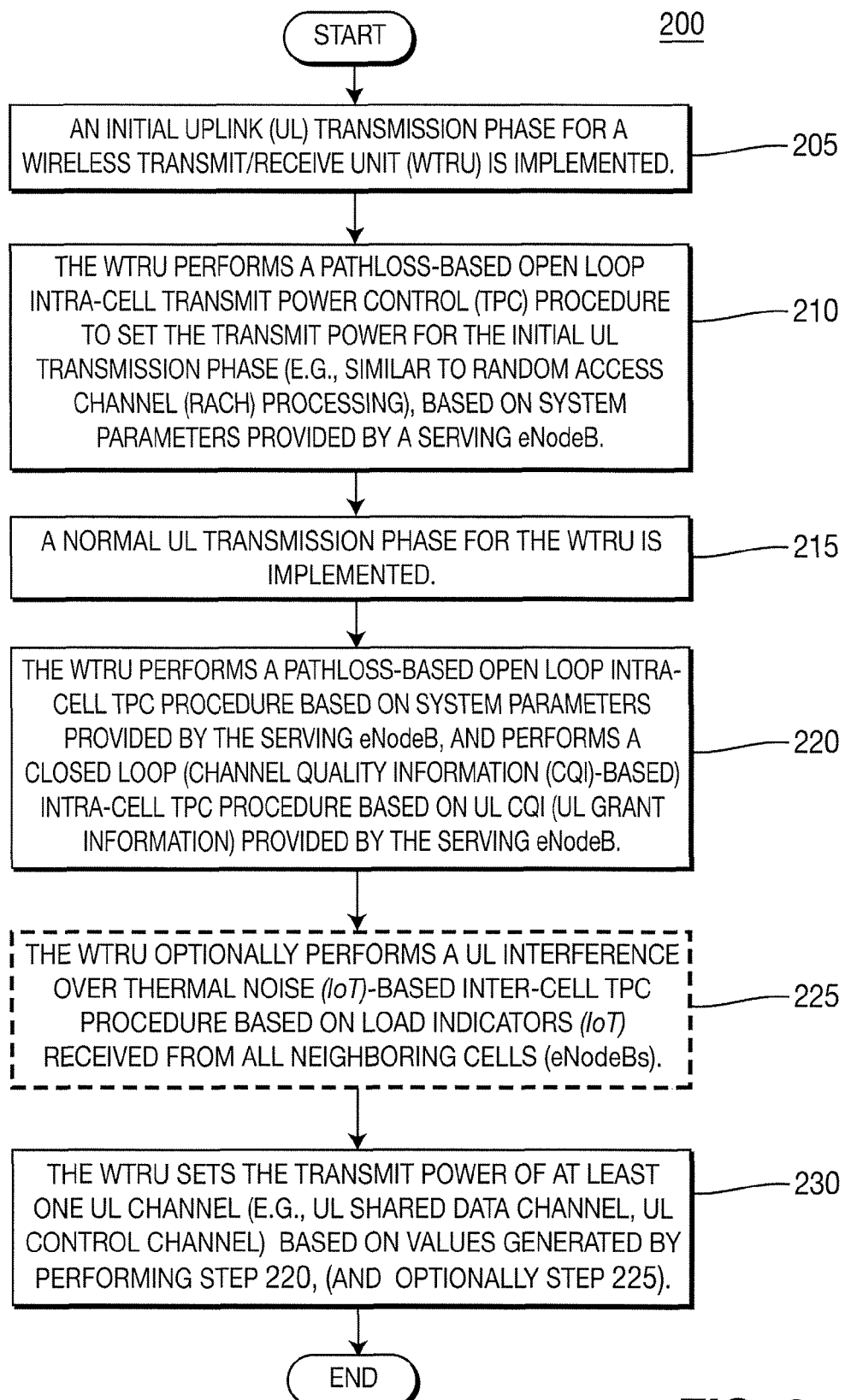
FIG. 2 shows a flow diagram of a TPC procedure implemented by the system of FIG. 1.

FIG. 2 shows a flow diagram of a TPC procedure 200 that may be implemented by the system 100 of FIG. 1. In step 205, an initial UL transmission phase is implemented. The WTRU 105 performs a pathloss-based open loop intra-cell TPC procedure to set the transmit power for the initial UL transmission phase (e.g., similar to a RACH procedure), based on system parameters provided by the serving eNodeB 110, such as SINR, $IN_0$, K and the transmit power of the DL reference signal 175 (step 210). In step 215, a normal UL transmission phase is implemented. The WTRU 105 performs a pathloss-based open loop intra-cell TPC procedure based on system parameters provided by the serving eNodeB 110, and performs a closed loop (CQI-based) intra-cell TPC procedure based on UL CQI (UL grant information) provided by the serving eNodeB 110 (step 220). Optionally, the WTRU performs an IoT-based inter-cell TPC procedure based on load indicators (IoT) received from all neighboring cells (eNodeBs) (step 225). In step 230, the WTRU 105 sets the transmit power of at least one UL channel, (e.g., the UL shared data channel 165, the UL control channel 170), based on values generated by performing step 220, (and optionally step 225).

Although the features and elements are described in the embodiments in particular combinations, each feature or element can be used alone without the other features and elements of the embodiments or in various combinations with or without other features and elements of the invention. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of performing transmit power control (TPC) of a wireless transmitter/receiver unit (WTRU) comprising:
    receiving downlink control information including both uplink scheduling information and TPC information, wherein the uplink scheduling information includes modulation and coding set (MCS) information;
    determining a transmit power level for a physical uplink channel, based on at least a measured pathloss, wherein the determined transmit power level is adjusted in response to the TPC information and the MCS information, wherein the determined transmit power level is further based on a weighting factor, $\alpha$, where $\alpha$:
    has a value from 0 to 1; and
    is multiplied to the measured pathloss; and
    transmitting on the physical uplink channel based on the scheduling information and the determined transmit power level.

2. A method according to claim 1, wherein the physical uplink channel is a physical uplink shared channel (PUSCH).

3. A method according to claim 2, wherein the determined transmit power level is further based on a modulation and coding set (MCS) factor associated with an MCS of the physical uplink shared channel transmission.

4. A method according to claim 1, wherein the determined transmit power control factor is based at least in part on a closed loop power control factor.

5. A method according to claim 1, wherein the determined transmit power level is based on a maximum transmit power level.

6. A method according to claim 1, wherein the physical uplink channel is a physical uplink control channel (PUCCH).

7. A method according to claim 6, wherein the determined transmit power level is further based on a quality factor associated with channel quality indication (CQI) information of the PUCCH.

8. A wireless transmitter/receiver unit (WTRU) comprising:
   a receiver configured to receive downlink control information including both uplink scheduling information and transmit power control (TPC) information, wherein the uplink scheduling information includes modulation and coding set (MCS) information;
   a processor configured to determine a transmit power level for a physical uplink channel, based on at least a measured pathloss, wherein the determined transmit power level is adjusted in response to the TPC information, the MCS information and wherein the determined transmit power level is further based on a weighting factor, $\alpha$, where $\alpha$:
   has a value from 0 to 1; and
   is multiplied to the measured pathloss; and
   a transmitter operably coupled to the processor, the transmitter configured to transmit on the physical uplink channel based on the scheduling information and the determined transmit power level.

9. A WTRU according to claim 8, wherein the physical uplink channel is a physical uplink shared channel (PUSCH).

10. A WTRU according to claim 9, wherein the determined transmit power level is further based on a modulation and coding set (MCS) factor associated with an MCS of the physical uplink shared channel transmission.

11. A WTRU according to claim 8, wherein the determined transmit power level is based at least in part on a closed loop power control factor.

12. A WTRU according to claim 8, wherein the determined transmit power level is based on a maximum transmit power level.

13. A WTRU according to claim 8, wherein the physical uplink channel is a physical uplink control channel (PUCCH) and the determined transmit power level is further based on a quality factor associated with channel quality indication (CQI) information of the PUCCH.

* * * * *

UNITED STATES PATENT AND TRADEMARK OFFICE
CERTIFICATE OF CORRECTION

PATENT NO. : 8,285,319 B2
APPLICATION NO. : 11/862459
DATED : October 9, 2012
INVENTOR(S) : Shin et al.

Page 1 of 1

It is certified that error appears in the above-identified patent and that said Letters Patent is hereby corrected as shown below:

ON THE TITLE PAGE

Item (56) OTHER PUBLICATIONS, page 2, left column, line 17, after "IPwireless,", delete ""ED-TDD:" and insert therefore --"EU-TDD:--.

Item (56) OTHER PUBLICATIONS, page 2, right column, line 5, delete "Ofdma" and insert therefore --OFDMA--.

Item (56) OTHER PUBLICATIONS, page 2, right column, line 33, delete "(Release 7)"", and insert therefore --(Release 6)"--.

At column 1, line 57, after "closed loop", delete "TCP" and insert therefore --TPC--.

In claim 4, at column 9, line 6, after "transmit power", delete "control factor" and insert therefore --level--.

In claim 8, at column 9, line 28, after "to the TPC", delete "information," and insert therefore --information and--.

Signed and Sealed this
Second Day of April, 2013

Teresa Stanek Rea
*Acting Director of the United States Patent and Trademark Office*